United States Patent
Deng et al.

(10) Patent No.: US 10,620,312 B2
(45) Date of Patent: Apr. 14, 2020

(54) LOCATING APPARATUS, LOCATING METHOD AND SHELF

(71) Applicant: BOE TECHNOLOGY GROUP CO., LTD., Beijing (CN)

(72) Inventors: Wei Deng, Beijing (CN); Shijie Cao, Beijing (CN); Huawei Yu, Beijing (CN); Hongyan Pei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/028,219

(22) Filed: Jul. 5, 2018

(65) Prior Publication Data

US 2019/0094354 A1    Mar. 28, 2019

(30) Foreign Application Priority Data

Sep. 22, 2017 (CN) .......................... 2017 1 0866019

(51) Int. Cl.
| | |
|---|---|
| *G01S 15/00* | (2020.01) |
| *G01S 15/04* | (2006.01) |
| *G06Q 10/08* | (2012.01) |
| *G01S 15/89* | (2006.01) |
| *G01S 15/08* | (2006.01) |
| *G01S 15/06* | (2006.01) |

(52) U.S. Cl.
CPC .............. *G01S 15/04* (2013.01); *G01S 15/06* (2013.01); *G01S 15/08* (2013.01); *G01S 15/894* (2013.01); *G06Q 10/087* (2013.01)

(58) Field of Classification Search
CPC ........ G01S 15/04; G01S 15/08; G01S 15/894; G06Q 10/087

USPC ................................................ 340/93; 367/93
See application file for complete search history.

(56) References Cited

U.S. PATENT DOCUMENTS

| | | | |
|---|---|---|---|
| 2004/0124742 A1* | 7/2004 | Takemura | H02N 2/108 310/317 |
| 2009/0224040 A1* | 9/2009 | Kushida | G06Q 10/08 235/385 |
| 2010/0169190 A1* | 7/2010 | Allison | G06K 7/10861 705/28 |
| 2014/0110584 A1* | 4/2014 | Campbell | G06Q 30/0261 250/340 |
| 2015/0071497 A1* | 3/2015 | Kuusisto | G06Q 30/02 382/107 |
| 2016/0003930 A1* | 1/2016 | Swope | G06K 7/10475 342/368 |
| 2018/0330171 A1* | 11/2018 | Corcoran | G06K 9/00805 |

* cited by examiner

*Primary Examiner* — Naomi J Small
(74) *Attorney, Agent, or Firm* — Foley & Lardner LLP

(57) ABSTRACT

The arrangements of the present disclosure provide a locating apparatus, a locating method, and a shelf. The locating apparatus includes a rotating mechanism, a distance measuring mechanism, and a locating circuit. The rotating mechanism is configured to control the distance measuring mechanism to rotate in a plane where the distance measuring mechanism is positioned, and to measure a rotation angle of the distance measuring mechanism in the plane. The distance measuring mechanism is configured to measure a distance between the distance measuring mechanism and an obstacle. The locating circuit is configured to determine a position of the obstacle in the plane based on the rotation angle of the distance measuring mechanism in the plane and the distance between the distance measuring mechanism and the obstacle.

7 Claims, 4 Drawing Sheets polar coordinate system → rectangular coordinate system

LOCATING APPARATUS, LOCATING METHOD AND SHELF

CROSS-REFERENCE TO RELATED APPLICATIONS

This application claims priority to Chinese Patent Application No. 201710866019.8 filed on Sep. 22, 2017, the contents of which are hereby incorporated by reference in its entirety as part of this application.

TECHNICAL FIELD

The disclosure relates to the technical field of goods management, and in particular to a locating apparatus, a locating method, and a shelf.

BACKGROUND

In traditional retail, shoppers have to queue up at the cashier after selecting the products to be purchased. The shopper's consumer experience will be greatly improved, if they can be saved from queuing for checkout. Here, taking out or putting back the goods from or to the shelves is called as tally. The automatic detection and locating of the tally is an important link of the supermarket unmanned process.

SUMMARY

In a first aspect of the present disclosure, there is provided a locating apparatus which includes a rotating mechanism, a distance measuring mechanism, and a locating circuit.

The rotating mechanism is configured to control the distance measuring mechanism to rotate in a plane where the distance measuring mechanism is positioned, and to measure a rotation angle of the distance measuring mechanism in the plane.

The distance measuring mechanism is configured to measure a distance between the distance measuring mechanism and an obstacle.

The locating circuit is configured to determine a position of the obstacle in the plane based on the rotation angle of the distance measuring mechanism in the plane and the distance between the distance measuring mechanism and the obstacle.

In some arrangements of the present disclosure, the rotating mechanism includes a steering actuator, and a first control circuit configured to control rotation of the steering actuator and in turn rotation of the distance measuring mechanism in the plane where the distance measuring mechanism is positioned, and measure the rotation angle of the distance measuring mechanism; and/or, the distance measuring mechanism includes an ultrasonic distance measuring sensor configured to transmit and receive an ultrasonic wave, and a second control circuit configured to calculate a distance between the sensor and the obstacle based on a time difference of transmitting and receiving an ultrasonic wave.

In some arrangements of the present disclosure, the locating circuit is configured to obtain the rotation angle of the distance measuring mechanism at the time when the ultrasonic distance measuring sensor receives an ultrasonic wave, and determine the position of the obstacle in the plane based on the rotation angle of the distance measuring mechanism in the plane and the distance between the distance measuring mechanism and the obstacle.

In a second aspect of the present disclosure, there is provided a locating method including:

controlling a distance measuring mechanism to rotate in a plane in which the distance measuring mechanism is positioned, and measuring a rotation angle of the distance measuring mechanism in the plane;

measuring a distance between the distance measuring mechanism and an obstacle; and determining a position of the obstacle in the plane based on the rotation angle of the distance measuring mechanism in the plane and the distance between the distance measuring mechanism and the obstacle.

In some arrangements of the present disclosure, controlling the distance measuring mechanism to rotate in the plane in which the distance measuring mechanism is positioned and determining the rotation angle of the distance measuring mechanism in the plane includes:

controlling rotation of a steering actuator, and in turn rotation of the distance measuring mechanism in the plane in which the distance measuring mechanism is positioned, and measuring the rotation angle of the distance measuring mechanism in the plane; and/or determining the distance between the distance measuring mechanism and the obstacle includes:

transmitting and receiving an ultrasonic wave by an ultrasonic distance measuring sensor; and calculating a distance between the ultrasonic distance measuring sensor and the obstacle based on a time difference of transmitting and receiving the ultrasonic wave.

In some arrangements of the present disclosure, determining the position of the obstacle in the plane based on the rotation angle of the distance measuring mechanism in the plane and the distance between the distance measuring mechanism and the obstacle includes:

obtaining the rotation angle of the distance measuring mechanism at the time of the ultrasonic distance measuring sensor receiving an ultrasonic wave, and determining the position of the obstacle in the plane based on the rotation angle of the distance measuring mechanism in the plane and the distance between the distance measuring mechanism and the obstacle.

In a third aspect of the present disclosure, there is provided a shelf including a container and a locating apparatus in any of the above arrangements.

In some arrangements of the present disclosure, the rotating mechanism is configured to control the distance measuring mechanism to rotate in a front plane of the container about a top or bottom corner of the container as an axis, and measure the rotation angle of the distance measuring mechanism in the plane.

In some arrangements of the present disclosure, the locating circuit is configured to determine whether the obstacle is within coverage of the shelf based on the rotation angle of the distance measuring mechanism in the plane and the distance between the distance measuring mechanism and the obstacle, and determine the position of the obstacle in the plane if yes.

In some arrangements of the present disclosure, the shelf further includes a processing circuit configured to determine a commodity corresponding to the position of the obstacle in the front plane of the container.

DETAILED DESCRIPTION

Now further detailed descriptions will be made to the present disclosure in conjunction with arrangements with reference to accompanying drawings to make the objectives, technical solutions, and advantages of the present disclosure more apparent.

Unless otherwise defined, technical or scientific terms used herein shall have a customary meaning as interpreted by those skilled in the art to which the present disclosure pertains. As used herein, the words "first", "second", and the like do not represent any order, quantity, or importance, but instead merely serve to distinguish between different components. Similarly, the word "a", "an" or "the" does not mean a limitation of quantity but means that at least one exists. The word "comprise" or "include" and the like means that an element or item before the word encompasses the elements or items listed after the word and their equivalents, without excluding other elements or items. The words "connected to" or "connected with" and the like are not limited to physical or mechanical connections, but may comprise electrical connections, whether directly or indirectly.

The automatic detection and locating of tally is an important link of the supermarket unmanned process. However, it is still difficult to accurately and quickly locate a tally action. In this regard, the purpose of an arrangement of the present disclosure is to provide a locating apparatus, a locating method, and a shelf in order to solve the technical problem that it is difficult to accurately and quickly locate the tally action.

Figure 1:
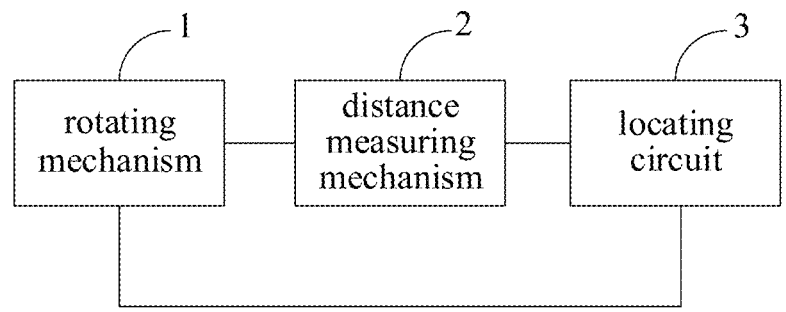
FIG. 1 is a schematic structural view of a locating apparatus according to an arrangement of the present disclosure.

As shown in FIG. 1 which is a schematic structural view of a locating apparatus according to an arrangement of the present disclosure, in an arrangement of the present disclosure, the locating apparatus includes a rotating mechanism 1, a distance measuring mechanism 2, and a locating circuit 3. The rotating mechanism 1 is configured to control the distance measuring mechanism 2 to rotate in the plane in which the distance measuring mechanism 2 is positioned, and measure the rotation angle of the distance measuring mechanism 2 in the plane. The distance measuring mechanism 2 is configured to measure the distance between the distance measuring mechanism 2 and an obstacle. The locating circuit 3 is configured to determine the position of the obstacle in the plane based on the rotation angle of the distance measuring mechanism 2 in the plane and the distance between the distance measuring mechanism 2 and the obstacle. Accordingly, the locating apparatus provided by the arrangement of the present disclosure can determine the position of the obstacle in the plane based on the rotation angle of the distance measuring mechanism in the plane and the distance between the distance measuring mechanism and the obstacle, and thus can quickly and accurately determine the position of the obstacle in the plane to facilitate accurate and fast locating of the tally action. It should be noted that the obstacle is the object to be located, and the plane where the distance measuring mechanism is positioned is the locating plane where the object to be located is positioned.

In another arrangement of the present disclosure, the rotating mechanism 1 is configured to control the distance measuring mechanism 2 to rotate about the rotating mechanism 1 as an axis in the plane in which the distance measuring mechanism 2 is positioned. As such, the rotating mechanism 1 is also positioned in the plane in which the distance measuring mechanism 2 is positioned, such that the position of the obstacle in the plane may be determined in polar coordinates with the rotating mechanism 1 as a center of circle. It should be noted that the rotating mechanism 1 may control the distance measuring mechanism 2 to rotate back and forth in the plane, alternatively control the distance measuring mechanism 2 to rotate in a clockwise or counterclockwise direction in the plane.

In another arrangement of the present disclosure, the rotating mechanism 1 continuously controls the distance measuring mechanism 2 to rotate, and the distance measuring mechanism 2 scans the plane in which the distance measuring mechanism 2 is positioned to determine whether there is an obstacle and measure the distance between the obstacle and the distance measuring mechanism. The rotating mechanism 1 measures the rotation angle of the distance measuring mechanism at the time when the distance measuring mechanism 2 measures the distance between the distance measuring mechanism 2 and the obstacle (i.e., the obstacle is positioned on the straight line where the rotating mechanism 1 and the distance measuring mechanism 2 are positioned).

Figure 2:
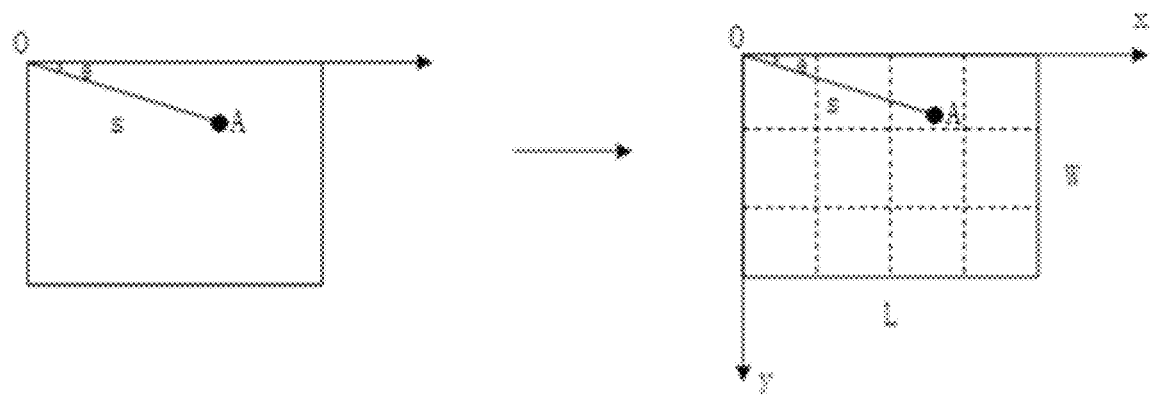
FIG. 2 is a view for locating principle of a locating apparatus according to an arrangement of the present disclosure.

Referring to FIG. 2 which is a view for locating principle of a locating apparatus according to an arrangement of the present disclosure, a polar coordinate system is established with the rotating mechanism 1 as the center and a horizontal line of the rotating mechanism 1 as the polar axis. In particular, when the distance measuring mechanism 2 detects that there is an obstacle A in the plane and measures the distance s between the distance measuring mechanism 2 and the obstacle A, the rotating mechanism 1 measures the rotation angle θ of the distance measuring mechanism 2. Then, the coordinates of the detected obstacle at this time are A (s, θ). In order to facilitate determination of the position of the obstacle, the polar coordinates of the detected obstacle are converted into rectangular coordinates. According to the conversion method from polar coordinates to rectangular coordinates, a rectangular coordinate system may be established with the origin of polar coordinates, i.e., the rotating mechanism 1, becoming the origin of the rectangular coordinate system, the polar axis becoming the x axis, and a vertical line perpendicular to the polar axis becoming the y axis. Accordingly, the position of point A (obstacle) in the rectangular coordinate system is A (s·cos θ, s·sin θ).

Figure 3:
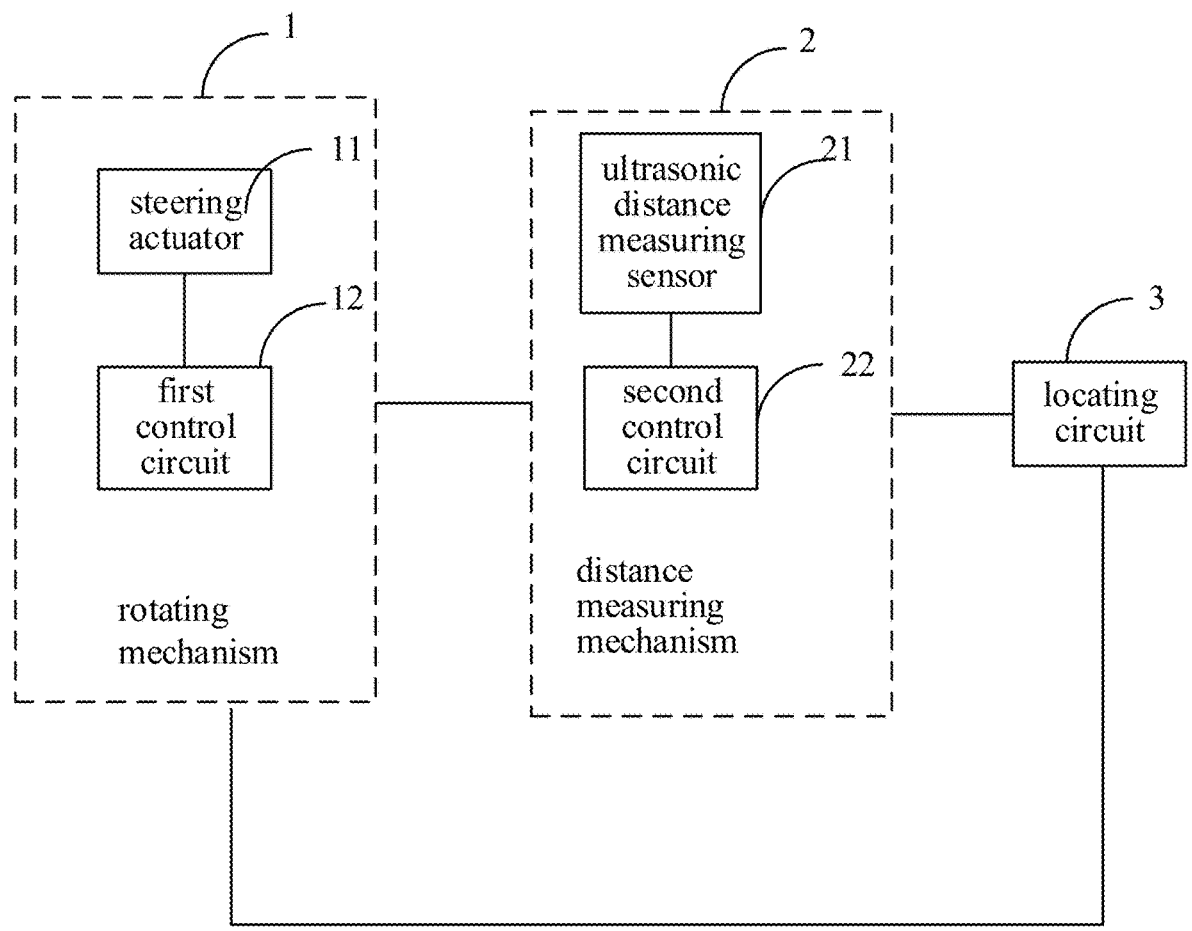
FIG. 3 is a schematic structural view of a locating apparatus according to another arrangement of the disclosure.

Referring to FIG. 3 which is a schematic structural view of a locating apparatus according to another arrangement of the present disclosure, in another arrangement of the present disclosure, the rotating mechanism 1 includes a steering actuator 11 and a first control circuit 12. The first control circuit 12 is configured to control the steering actuator 11 to rotate and in turn the distance measuring mechanism 2 to rotate in the plane in which the distance measuring mechanism is positioned, and to measure the rotation angle of the distance measuring mechanism 2. The steering actuator is an actuator of angle servo, and the first control circuit 12 may control the rotation of the distance measuring mechanism 2 by controlling the steering actuator 11, which also facilitates measuring the rotation angle of the distance measuring mechanism. In an example, the first control circuit 12 may control the distance measuring mechanism 2 to rotate at a uniform speed to ensure that the distance measuring mechanism 2 may perform a full scan on the plane where it is positioned.

In still another arrangement of the present disclosure, the distance measuring mechanism 2 includes an ultrasonic distance measuring sensor 21 for transmitting and receiving an ultrasonic wave, and a second control circuit 22 for calculating the distance between the ultrasonic distance measuring sensor 21 and the obstacle based on the time difference of transmitting and receiving an ultrasonic wave.

In this arrangement, the locating circuit 3 is configured to obtain the rotation angle of the distance measuring mechanism 2 in the plane at the time when the ultrasonic distance measuring sensor 21 receives an ultrasonic wave, and to determine the position of the obstacle in the plane based on the rotation angle of the distance measuring mechanism 2 and the distance between the distance measuring mechanism 2 and the obstacle.

In particular, the second control circuit 22 controls the ultrasonic distance measuring sensor 21 to transmit an ultrasonic wave, and at the same time, time counting begins. The time counting stops upon the ultrasonic distance measuring sensor 21 receiving the reflected ultrasonic wave (an ultrasonic wave will return immediately upon hitting an obstacle as it propagates in the air). At the same time, the locating circuit 3 obtains the rotation angle θ of the distance measuring mechanism 2 in the plane from the first control circuit 11 at this time. The propagation speed of the ultrasonic wave in the air is v, and the distance s between the ultrasonic distance measuring sensor 21 and the obstacle is calculated based on the time difference Δt of transmitting and receiving an ultrasonic wave, that is $$s = \frac{v \times \Delta t}{2}.$$

Usually, the propagation speed v of the ultrasonic wave in the air is taken as 340 m/s, and the distance s between the ultrasonic distance measuring sensor 21 and the obstacle is calculated.

Figure 4:
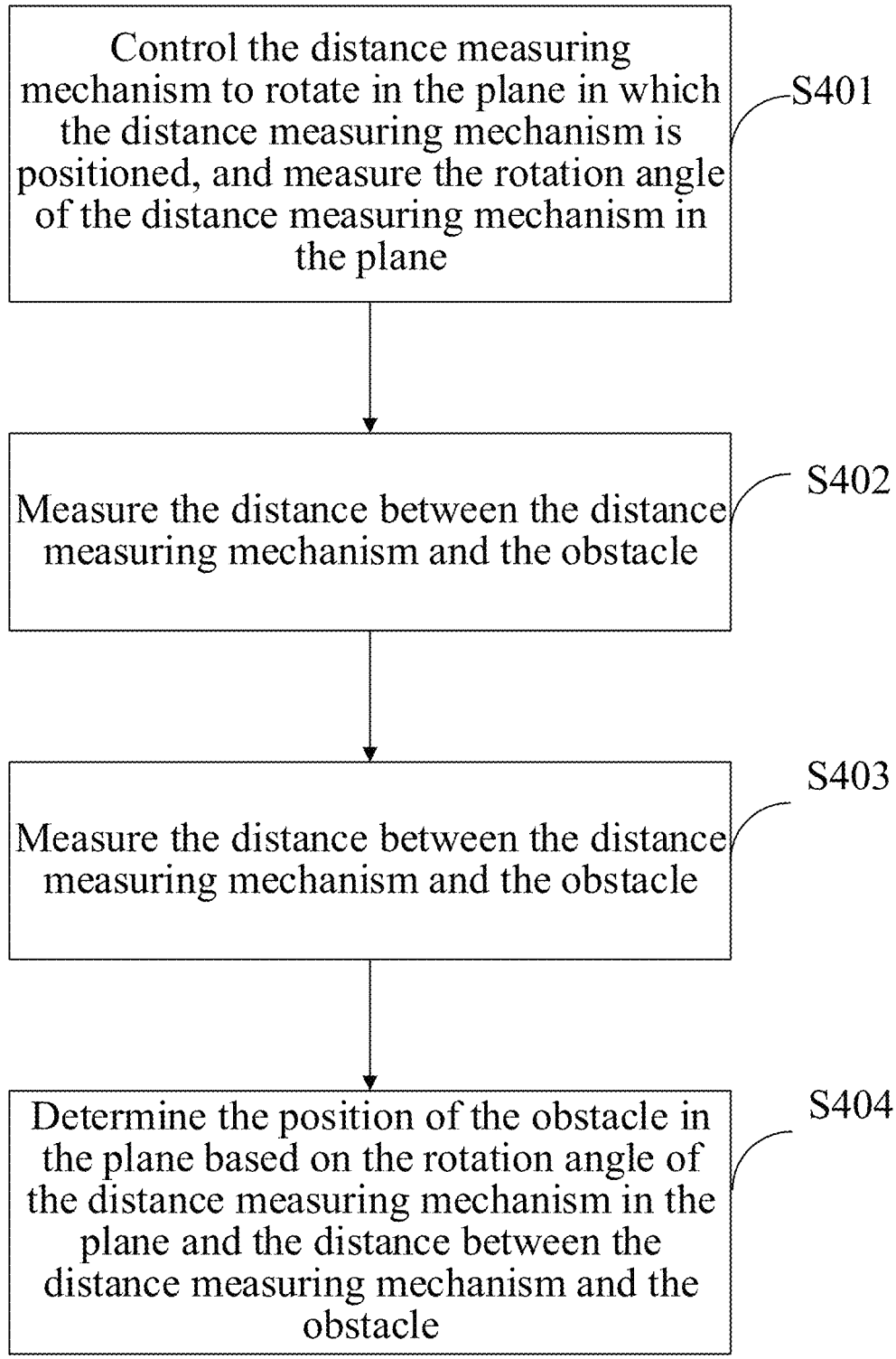
FIG. 4 is a flowchart of a locating method according to an arrangement of the present disclosure.

The present disclosure also proposes a locating method. As shown in FIG. 4, which is a flowchart of a locating method according to an arrangement of the present disclosure, in an arrangement of the present disclosure, the locating method includes:

in S401, controlling the distance measuring mechanism to rotate in the plane in which the distance measuring mechanism is positioned, and measuring the rotation angle of the distance measuring mechanism in the plane;

in S402, measuring the distance between the distance measuring mechanism and the obstacle; and in S403, determining the position of the obstacle in the plane based on the rotation angle of the distance measuring mechanism in the plane and the distance between the distance measuring mechanism and the obstacle.

Therefore, the locating method provided by the arrangement of the present disclosure can determine the position of the obstacle in the plane based on the rotation angle of the distance measuring mechanism in the plane and the distance between the distance measuring mechanism and the obstacle, and thus can quickly and accurately determine the position of obstacles to facilitate accurate and fast locating of a tally action.

In another arrangement of the present disclosure, in S401, the distance measuring mechanism may be controlled to rotate about the rotating mechanism as an axis and in the plane in which the distance measuring mechanism is positioned. As such, the rotating mechanism is also positioned in the plane where the distance measuring mechanism is positioned, such that the position of the obstacle in the plane may be determined in polar coordinates with the rotating mechanism as a center of circle. It should be noted that the distance measuring mechanism may be controlled to rotate back and forth in the plane, alternatively to rotate in a clockwise or counterclockwise direction in the plane.

In another arrangement of the present disclosure, the distance measuring mechanism may be continuously controlled to rotate, and scan the plane in which it is positioned to determine whether there is an obstacle and measure the distance between the obstacle and the distance measuring mechanism. The rotation angle of the distance measuring mechanism is measured at the time of measuring the distance between the distance measuring mechanism and the obstacle, and thus the rotation angle of the distance measuring mechanism in the plane and the distance between the distance measuring mechanism and the obstacle are obtained, and then the position of the obstacle in the plane is determined.

In another arrangement of the present disclosure, the distance measuring mechanism rotating in the plane in which the distance measuring mechanism is positioned and measuring the rotation angle of the distance measuring mechanism in the plane includes:

controlling the steering actuator to rotate and in turn the distance measuring mechanism to rotate in the plane in which the distance measuring mechanism is positioned, and measuring the rotation angle of the distance measuring mechanism in the plane.

In particular, by controlling the rotation of the steering actuator, the distance measuring mechanism is controlled to rotate in the plane where the distance measuring mechanism is positioned, and the rotation angle of the distance measuring mechanism is measured. The steering actuator is an actuator of angle servo, and the locating method may be used to control the rotation of the distance measuring mechanism by controlling the steering actuator, and also facilitate measuring the rotation angle of the distance measuring mechanism. In an example, the distance measuring mechanism may be controlled to rotate at a uniform speed to ensure that the distance measuring mechanism can perform a full scan on the plane where it is positioned.

In some arrangements of the present disclosure, measuring the distance between the distance measuring mechanism and the obstacle includes:

transmitting and receiving an ultrasonic wave by the ultrasonic distance measuring sensor; and calculating the distance between the ultrasonic distance measuring sensor and the obstacle based on the time difference of transmitting and receiving the ultrasonic wave.

In another arrangement of the present disclosure, determining the position of the obstacle in the plane based on the rotation angle of the distance measuring mechanism in the plane and the distance between the distance measuring mechanism and the obstacle includes:

obtaining the rotation angle of the distance measuring mechanism at the time when the ultrasonic distance measuring sensor receives an ultrasonic wave, and determining the position of the obstacle in the plane based on the rotation angle of the distance measuring mechanism and the distance between the distance measuring mechanism and the obstacle.

In particular, the ultrasonic distance measuring sensor may be controlled to transmit an ultrasonic wave, and at the same time, time counting begins. The time counting stops upon the ultrasonic distance measuring sensor receiving the reflected ultrasonic wave. At the same time, the rotation angle θ of the distance measuring mechanism 2 in the plane is obtained at this time. The propagation speed of the ultrasonic wave in the air is v, and the distance s between the ultrasonic distance measuring sensor and the obstacle is calculated based on the time difference Δt of transmitting and receiving an ultrasonic wave, that is $$s = \frac{v \times \Delta t}{2}.$$

Usually, the propagation speed v of the ultrasonic wave in the air is taken as 340 m/s, and the distance s between the ultrasonic distance measuring sensor and the obstacle is calculated.

The present disclosure also provides a shelf including a container and the locating apparatus described in any of the above arrangements. Therefore, the shelf can accurately and quickly locate the obstacle based on the locating apparatus and identify the ally action and the position where the tally action occurs. It should be noted that the obstacle is an object to be located, such as a tallyman's arm or a robot arm, so that the tally action and the position where the tally action occurs may be identified by locating the tallyman's arm or robot arm.

Figure 5:
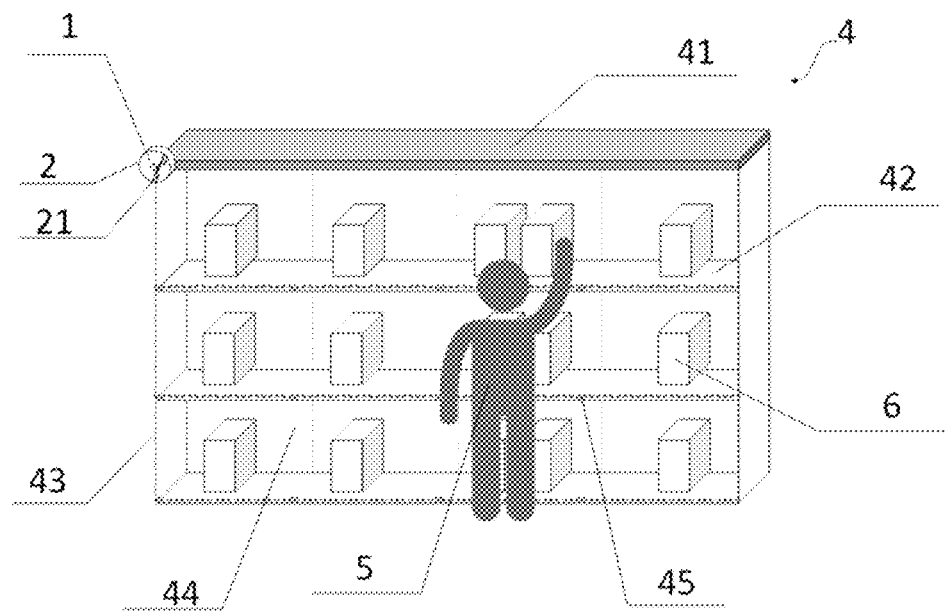
FIG. 5 is a schematic structural view of a shelf according to an arrangement of the present disclosure.

In an arrangement of the present disclosure, as shown in FIG. 5, the container 4 may include a top plate 41, a plurality of shelf plates 42, two support plates 43 and a back plate 44. The opposing ends of the top plate 41 are respectively connected to the ends of the support plates 43. The shelf plates 42 are disposed between the support plates 43 for displaying commodities 6. The back plate 44 is disposed on one side of the container 4 to prevent the commodities from falling out of the container 4. At the time of tally, the person (obstacle) 5 stands at the opposite side of the back plate 44, that is, the front plane of the container 4. Optionally, tags 45 may also be provided on the shelf plates 42 for marking names, origins, prices and other information of the commodities so as to facilitate the tallyman to view the commodities.

In another arrangement of the present disclosure, the rotating mechanism 1 is configured to control the distance measuring mechanism 2 to rotate about a top corner or bottom corner of the container 4 as an axis in the front plane of the container 4, and to measure the rotation angle of the distance measuring mechanism 2 in the plane. In particular, the top corner of the container 4 is the connection between the top plate 41 and the support plate 43. Controlling the distance measuring mechanism 2 to rotate with the top or bottom corner of the container 4 as the axis may conveniently determine the exact position of a person or a person's hand (i.e., the obstacle) in the front plane of the container through polar coordinates. In particular, in another arrangement of the present disclosure, as shown in FIG. 5, both the rotating mechanism 1 and the distance measuring mechanism 2 are positioned at a top or bottom corner of the container 4 such that the distance measuring mechanism 2 is rotated about the top corner or bottom corner of the container as the axis. In this arrangement, a top corner or bottom corner of the container 4 may be used as a center of circle, the top plate 41 may be used as a polar axis, and the distance measuring mechanism 2 may be rotated in a range of 0–90°.

In another arrangement of the present disclosure, both the rotating mechanism 1 and the distance measuring mechanism 2 are positioned at the top plate 41. In this arrangement, the shelf may also determine the exact position of a person or a person's hand (i.e., an obstacle) in the front plane of the container 4 through polar coordinates. In this arrangement, the rotating mechanism 1 may be used as the center of circle, the top plate 41 may be used as the polar axis, and the distance measuring mechanism 2 may be rotated in the range of 0–180°.

It should be noted that the rotating mechanism 1 includes a steering actuator 11. In the present disclosure, the position of the rotating mechanism 1 may be replaced with the position of the steering actuator 11, and the first control circuit 12 may be positioned at any position. Correspondingly, the distance measuring mechanism 2 includes an ultrasonic distance measuring sensor 21. In the present disclosure, the position of the distance measuring mechanism 2 may be replaced with the position of the ultrasonic distance measuring sensor 21, and the second control circuit 22 may be positioned at any position.

Figure 6:
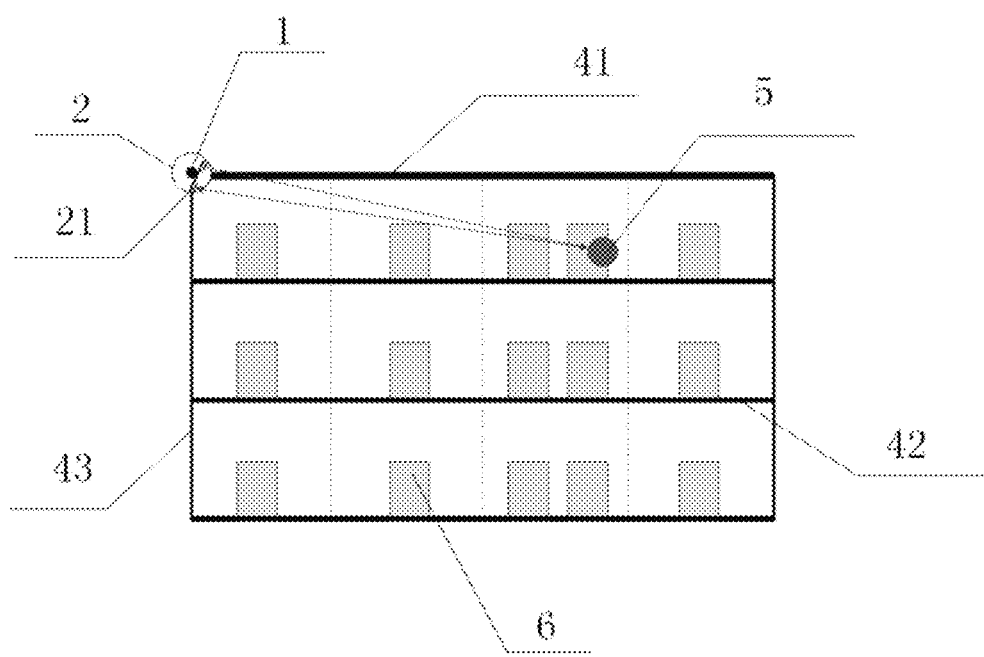
FIG. 6 is a schematic view of a method for locating a shelf according to an arrangement of the present disclosure.

The steering actuator 11 controls the ultrasonic distance measuring sensor 21 to rotate in the front plane of the container 4, and the ultrasonic distance measuring sensor 21 scans the front plane of the container 4. As can be seen from FIGS. 2 and 6, automatic detection and accurate locating of the tally action may be realized by obtaining the position of the obstacle 5, such as the tallyman's hand 5, in the front plane of the container 4 using the detected distance between the ultrasonic distance measuring sensor 21 and the obstacle 5 in combination with the rotation angle of the ultrasonic distance measuring sensor 21, the coordinates of the tally action in the polar coordinate system and the conversion between the polar coordinate system and the rectangular coordinate system which is established with the top plate 41 as the x axis and the support plate 43 as the y axis. It should be noted that the obstacle may be a loading/unloading device, a tallyman' or a buyer's hand, and the like. Therefore, the ultrasonic distance measuring sensor positioned on the shelf may detect its distance from a shopper's hand (or a tally tool) and the angle when the shopper's hand (or tally tool) enters the shelf during the tally, and can determine the position of the shopper's ally action relative to the shelf by means of the conversion between the polar coordination system and the rectangular coordination system.

In still another arrangement of the present disclosure, the locating circuit 3 is configured to determine whether the obstacle 5 is within the coverage of the shelf based on the rotation angle of the distance measuring mechanism 2 in the plane and the distance between the distance measuring mechanism 2 and the obstacle 5. If yes, the position of the obstacle 5 in the plane is determined. In particular, assumed that the length of the container 4 is L, and the height is W. If s·cos θ<L and s·sin θ<W, it is determined that the obstacle 5 is within the coverage of the shelf, and further the position of the obstacle 5 in the plane determined. Otherwise, it suggests that the obstacle 5 is beyond the coverage of the shelf, and it is not necessary to locate it to avoid invalid location.

In another arrangement of the present disclosure, the shelf further includes a processing circuit for determining the commodity corresponding to the position of the obstacle in the front plane of the container. In particular, according to the position of the obstacle 5, a commodity closest to the position is retrieved to determine the target of the tally. It should be noted that, according to the tallied target, i.e., a commodity, the specific information of the commodity may be given, such as the commodity name, origin, price, and the like.

It can be seen that the locating apparatus and the locating method provided by the arrangements of the present disclosure can determine the position of the obstacle in the plane according to the rotation angle of the distance measuring mechanism in the plane and the distance between the distance measuring mechanism and the obstacle, and thus can quickly and accurately determine the position of the obstacle to facilitate accurate and fast locating of the tally action. The shelf provided by the arrangements of the present disclosure can identify the ally action and the position where the tally action occurs by accurately and quickly locating the obstacle by the locating apparatus.

Circuit(s) (e.g., locating circuit) in arrangements of the present disclosure may be implemented via one or more electronic circuits such as Digital Signal Processors (DSPs), Application Specific Integrated Circuits (ASICs), Processors, Microprocessors, Controllers, Microcontrollers, Field Programmable Array (FPGA), Programmable Logic Device or any combination thereof. Some of the functions or processes described in the arrangements of the present disclosure can also be implemented by software executed on the above electronic circuit(s).

Those skilled in the art should understand that the discussion of any of the above arrangements is merely exemplary and is not intended to suggest that the scope of the disclosure as defined by the claims is limited to these examples. Under the teachings of the present disclosure, the above arrangements or the technical features in different arrangements may also be combined, and there are many other variations on different aspects of the disclosure as described above, which are not provided in detail for the sake of brevity. Therefore, any omissions, modifications, equivalent replacements, improvements, etc. made within the spirit and principle of the present disclosure should be encompassed in the protection scope of the present disclosure.

What is claimed is:

1. A system for locating a tally action, the system comprising:
    a shelf comprising container;
    an ultrasonic distance measuring sensor arranged on the shelf and configured to detect an obstacle which enters the shelf during the tally action and to measure a distance s between the obstacle and the ultrasonic distance measuring sensor;
    a rotating mechanism configured to control the ultrasonic distance measuring sensor to rotate by a rotation angle $\theta$;
    a processor configured to determine whether the obstacle is within a coverage of the shelf based on the rotation angle $\theta$ of the ultrasonic distance measuring sensor and the distance s between the ultrasonic distance measuring sensor and the obstacle;
    wherein the processor is configured to determine whether the following formulas are met, the formulas are $s \cdot \cos\theta < L$ and $s \cdot \sin\theta < W$, where L is a length of the container and W is a height of the container, if the processor determines that the formulas are met, the processor determines that the obstacle is within the coverage of the shelf, and if the processor determines that any one of the formulas is not met, the processor determines that the obstacle is beyond the coverage of the shelf and does not determine the position of the obstacle;
    wherein the processor is further configured to, determine a commodity corresponding to the position according to the position of the obstacle in the shelf;
    wherein the system further comprises one or more tags, and a tag corresponding to the determined position of the obstacle shows information regarding the commodity.

2. The system according to claim 1, wherein the rotating mechanism comprises a steering actuator, and a first control circuit configured to control rotation of the steering actuator and in turn rotation of the ultrasonic distance measuring sensor in a plane where the ultrasonic distance measuring sensor is positioned, and to measure the rotation angle of the ultrasonic distance measuring sensor.

3. The system according to claim 1, wherein the ultrasonic distance measuring sensor is configured to transmit and receive an ultrasonic wave, and determine a distance between the ultrasonic distance measuring sensor and the obstacle based on a time difference of transmitting and receiving an ultrasonic wave.

4. The system according to claim 2, wherein the ultrasonic distance measuring sensor is configured to transmit and receive an ultrasonic wave, and determine a distance between the ultrasonic distance measuring sensor and the obstacle based on a time difference of transmitting and receiving an ultrasonic wave.

5. The system according to claim 2, wherein the first control circuit is configured to control the ultrasonic distance measuring sensor to rotate at a uniform speed such that the ultrasonic distance measuring sensor for making a full scan on the plane where it is positioned.

6. A method for locating a tally action, comprising:
    obtaining, by a processor, from am ultrasonic distance measuring sensor a distance between an obstacle and the ultrasonic distance measuring sensor, wherein the ultrasonic distance measuring sensor detects the obstacle which enters a shelf during the tally action and measures the distance s between the obstacle and the ultrasonic distance measuring sensor, and the shelf comprises a container;
    obtaining, by the processor, a rotation angle $\theta$ of the ultrasonic distance measuring sensor, wherein a rotating mechanism controls the ultrasonic distance measuring sensor to rotate by the rotation angle $\theta$;
    determining, by the processor, whether the obstacle is within a coverage of the shelf based on the rotation angle $\theta$ of the ultrasonic distance measuring sensor and the distance s between the ultrasonic distance measuring sensor and the obstacle;
    wherein whether the processor determines that the following formulas are met, the formulas are $s \cdot \cos\theta < L$ and $s \cdot \sin\theta < W$, where L is a length of the container and W is a height of the container, if the processor determines that the formulas are met, the processor determines that the obstacle is within the coverage of the shelf, and if the processor determines that any one of the formulas is not met, the processor determines that the obstacle is beyond the coverage of the shelf and does not determine the position of the obstacle,
    wherein the method further comprises determining by the processor a commodity corresponding to the position according the position of the obstacle in the shelf; and sending information regarding the commodity to a tag corresponding to the determined position of the obstacle, so that they tag shows information regarding the commodity.

7. A system for locating a tally action, the system comprising:
- a shelf comprising a container;
- an ultrasonic distance measuring sensor arranged on the shelf and configured to detect an obstacle which enters the shelf during the tally action and to measure a distance s between the obstacle and the ultrasonic distance measuring sensor;
- a rotating mechanism configured to control the ultrasonic distance measuring sensor to rotate by a rotation angle $\theta$;
- a processor configured to determine whether the obstacle is within a coverage of the shelf based on the rotation angle $\theta$ of the ultrasonic distance measuring sensor and the distances between the ultrasonic distance measuring sensor and the obstacle;
- wherein the processor is configured to determine whether the following formulas are met, the formulas are $s \cdot \cos\theta < L$ and $s \cdot \sin\theta < W$, where L is a length of the container and W is a height of the container, if the processor determines that the formulas are met, the processor determines that the obstacle is within the coverage of the shelf, and if the processor determines that any one of the formulas is not met, the processor determines that the obstacle is beyond the coverage of the shelf and does not determine the position of the obstacle.

* * * * *